E. D. DICKINSON.
EMERGENCY VALVE MECHANISM FOR TURBINE INSTALLATIONS AND THE LIKE.
APPLICATION FILED MAR. 20, 1920.
1,409,530.
Patented Mar. 14, 1922.
2 SHEETS—SHEET 1.
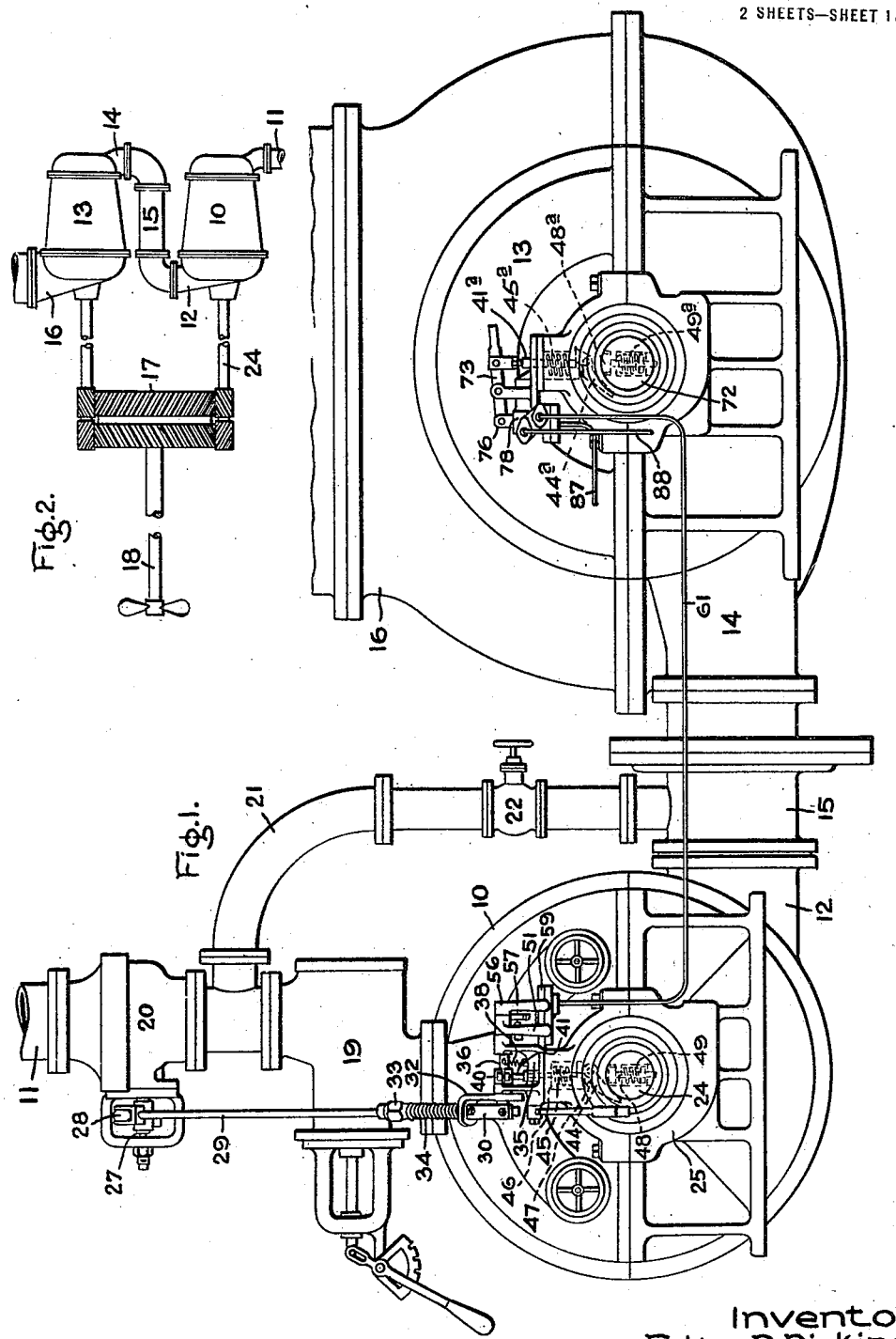
Inventor:
Edgar D. Dickinson,
by
His Attorney

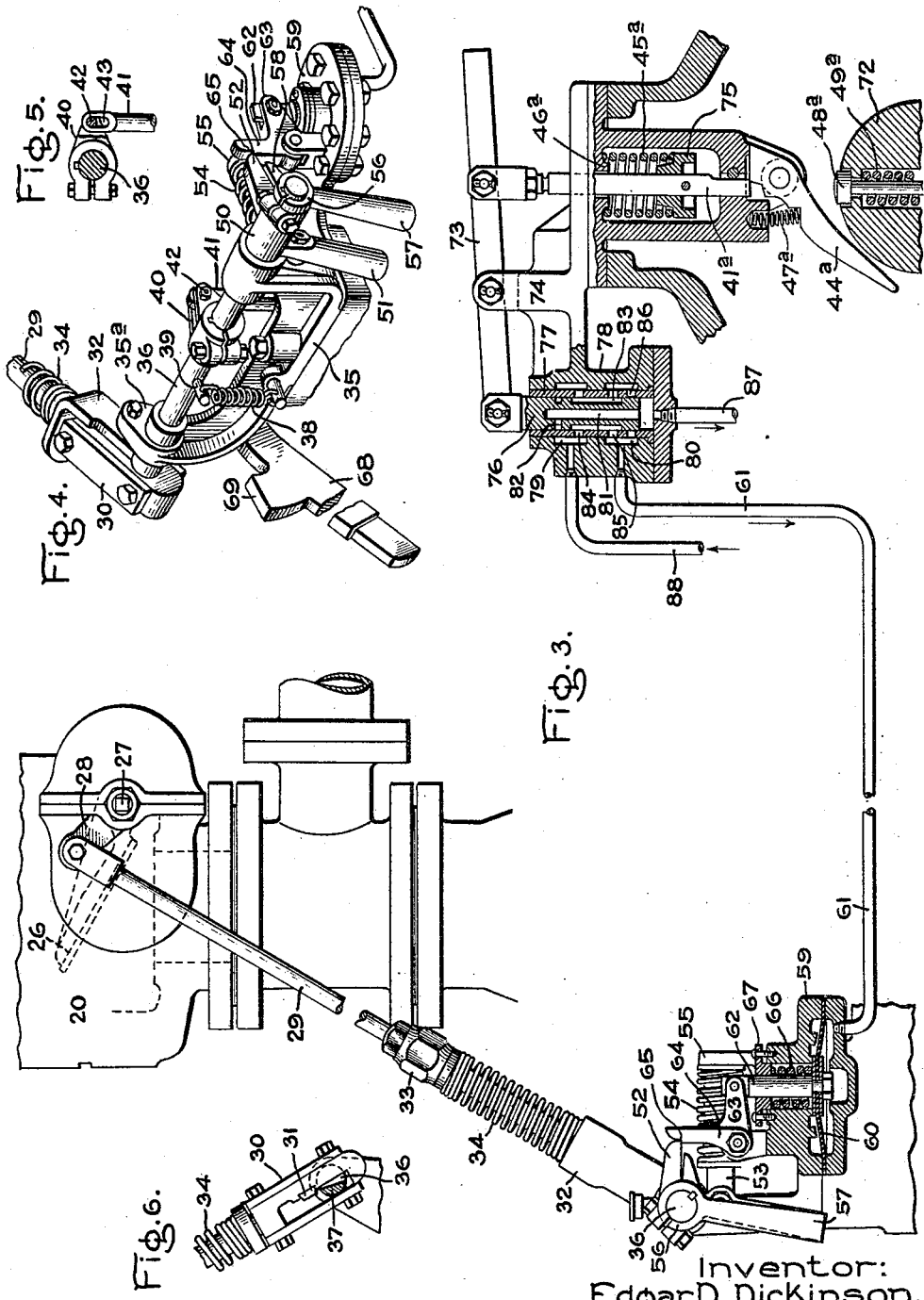

UNITED STATES PATENT OFFICE.

EDGAR D. DICKINSON, OF SCHENECTADY, NEW YORK, ASSIGNOR TO GENERAL ELECTRIC COMPANY, A CORPORATION OF NEW YORK.

EMERGENCY VALVE MECHANISM FOR TURBINE INSTALLATION AND THE LIKE.

1,409,530.   Specification of Letters Patent.   Patented Mar. 14, 1922.

Application filed March 20, 1920. Serial No. 367,402.

*To all whom it may concern:*

Be it known that I, EDGAR D. DICKINSON, a citizen of the United States, residing at Schenectady, county of Schenectady, State of New York, have invented certain new and useful Improvements in Emergency Valve Mechanism for Turbine Installations and the like, of which the following is a specification.

The present invention relates to emergency valve mechanisms such as are used in connection with elastic fluid turbine installations and the like, to shut off the supply of elastic fluid thereto in case of abnormal operating conditions, and has for its object to provide an improved arrangement which is particularly adapted for turbne installation comprising two or more machines driving either the same or different loads, and arranged in series as regards the flow of elastic fluid. In the present instance, and by way of example, my invention is shown in connection with an installation comprising a high pressure turbine and a low pressure turbine into which it exhausts, the two turbines being connected in parallel to drive a common load which is shown in the form of a ship's propeller to which the turbine shafts are connected through suitable gearing.

For a consideration of what I believe to be novel and my invention, attention is directed to the accompanying description and the claims appended thereto.

In the drawing, Fig. 1 is an end view of a turbine installation with my improved emergency mechanism applied thereto; Fig. 2 is a diagram of an installation showing the manner in which the turbines may be connected to a load; Fig. 3 is a diagrammatic view of the emergency mechanism; Fig. 4 is a perspective view of part of the emergency mechanism, and Figs. 5 and 6 are views of details.

Referring to the drawing, particularly to Figs. 1 and 2, 10 indicates a high pressure elastic fluid turbine having an inlet conduit 11 for the admission of elastic fluid and a discharge conduit 12, and 13 indicates a low pressure elastic fluid turbine having an inlet conduit 14 which is connected to exhaust conduit 12 by a conduit 15. The exhaust conduit 16 of low pressure turbine 13 may be connected to a suitable condenser (not shown) in the usual manner. In the present instance the two turbines are shown in Fig. 2 as being geared by gearing 17 to a propeller shaft 18 which may be taken as illustrative of a common load for the two machines.

In inlet conduit 11 is a hand-controlled valve 19 for regulating the flow of elastic fluid to turbine 10 and also an emergency valve 20. 21 is a bypass conduit by means of which high pressure elastic fluid may be admitted directly from conduit 11 to the low pressure turbine 13, such admission being controlled by a suitable valve 22.

Now, according to my invention, I place the emergency valve 20 under the control of a means responsive to the speed of the high pressure turbine and to the speed of the low pressure turbine, so that in case of excessive speed of either turbine, valve 20 will be caused to automatically close, thereby shutting off the flow of elastic fluid to both machines. Also I place such valve under the control of the fluid pressure of the lubricant supplied to the turbine bearings so that in case the supply of lubricant fails the valve 20 will be automatically closed. By this arrangement, therefore, should either turbine attain excessive speed, the supply of elastic fluid for both turbines is shut off. Or, should the pressure in the lubricating system fail, then both turbines will be immediately shut down.

Referring now particularly to the high pressure turbine 10, its shaft is indicated at 24 and one of its bearings at 25. Valve 20 which may be of any desired structure, is shown in the present instance as being a simple flap valve 26 carried on a shaft 27 to which is attached an operating arm 28. Connected to operating arm 28 is a rod 29, the lower end of which terminates in a rectangular frame 30 in which is catch plate 31 (Fig. 6). Rod 29 is guided by a bracket 32 and surrounding the lower end of rod 29 with one end connected to the bracket 32 and the other end to an adjusting nut 33, is a spring 34. When rod 29 is pushed upward to open valve 26, spring 34 is put under tension so that it has a tendency to pull the valve toward closed position; in other words, it forms a means for biasing the valve toward closed position. Mounted on bearing 25 is a U-shaped bracket 35 in the arms of which is pivoted a trip shaft 36. Bracket 32 surrounds shaft 36 and is bolted to a projection on one of the arms of bracket 35 as indicated at 35ª. One end of trip shaft 36 projects through rectangular frame 30 and has a cut-away portion forming a latch 37 which is adapted to engage catch plate 31. At 38 is a spring connected at one end to bracket 35 and the other end to a pin 39 which projects from shaft 36. Spring 38 acts to turn shaft 36 in a direction to hold catch 37 in engagement with catch plate 31. In the drawing catch 37 is shown as being in engagement with catch plate 31 so that valve 26 is held open. To close the valve, it will be clear that it is necessary to turn shaft 36 against the action of spring 38 so as to move the catch 37 out of engagement with catch plate 31 whereupon spring 34 will pull down on rod 29 and close the valve. Connected to shaft 36 is a bifurcated lever arm 40 between the outer ends of the bifurcation of which is fastened the upper end of a plunger rod 41. The connection between the upper end of plunger rod 41 and lever arm 40 is formed as shown in Fig. 5 by means of a bolt 42 which passes through a slot 43 in rod 41. By this arrangement it will be seen that there is a lost motion connection between arm 40 and rod 41 so that shaft 36 may be turned to a limited extent without necessitating a movement of rod 41. Spring 38 normally holds bolt 42 at the top of slot 43 and maintains catch 37 in engagement with catch plate 31. The lower end of plunger rod 41 rests on a pivoted trip finger 44 (Fig. 1) and is normally pressed downward by a spring 45 which surrounds plunger rod 41 and at one end engages a collar on the plunger rod and at the other end engages a fixed abutment 46. Trip finger 44 is pressed toward a position where it is under plunger rod 41 by a spring 47 and the outer end of trip finger 44 projects down adjacent to shaft 24. In an opening in shaft 24 is a plunger 48 held by a spring 49. The arrangement is such that when the speed of the shaft reaches a predetermined high value, plunger 48 will be thrown out by centrifugal force against the action of spring 49 and will engage the end of trip finger 44 and knock it from under plunger rod 41. This releases plunger rod 41 which is forced downward by spring 45 thus turning shaft 36 against the action of spring 38 and releasing catch 37. Plunger 48 and spring 49 are shown diagrammatically and only by way of example of a speed responsive arrangement and it will be understood that any suitable arrangement for tripping finger 44 may be used. Loosely mounted on shaft 36 at the end remote from that at which catch 37 is located is a collar 50 to which is connected an operating handle 51 and a lever arm 52. Hinged to operating handle 51 is a spring plug 53 (Fig. 3) to which is attached one end of a spring 54, the other end of which is attached to a fixed abutment 55. Spring 54 tends to turn shaft 36 in a direction opposite to that in which spring 38 tends to turn it. Fixed to shaft 36, adjacent collar 50 is a split collar 56 having a handle 57 and an arm 58 thereon, arm 58 being located directly beneath lever arm 52 as best shown in Fig. 4. Supported by bearing 25 adjacent to bracket 35 is a pressure responsive mechanism comprising a casing 59 in which is a diaphragm 60. Connected to casing 59 beneath diaphragm 60 is a pressure pipe 61. Connected to diaphragm 60 and projecting upwardly through an opening in casing 59 is a pin 62 having a flattened end to which is connected an arm 63 of a bell crank lever, the other arm 64 of which projects vertically and has a catch 65. The bell crank lever is pivoted at its elbow to lugs projecting from casing 59. Surrounding pin 62 is a spring 66 which at one end pushes against diaphragm 60 and at the other end against a fixed abutment 67. This spring tends to force the diaphragm downward. As long as the pressure under diaphragm 60 is sufficient to hold the diaphragm up against spring 66, catch 65 will be held under the end of lever 52. Pivoted on bracket 35 is a resetting lever 68 provided with a projection 69 adapted to engage the lower end of frame 30.

Referring now to the low pressure turbine 13, its shaft 72 is provided with a speed responsive plunger 48$^a$ held by a spring 49$^a$ in a manner similar to that shown at 48 and 49 in connection with shaft 24. Adjacent shaft 72 is a trip finger 44$^a$ similar to trip finger 44 of the high pressure turbine 10, and it is held by a suitable spring 47$^a$ under the end of a plunger rod 41$^a$ the upper end of which is connected to a lever 73 pivoted on a bracket 74. Plunger rod 41$^a$ is normally pressed downward by a spring 45$^a$ which at one end engages a collar 75 on rod 41$^a$ and at the other end engages a fixed abutment 46$^a$. The arrangement of spring 45$^a$, abutment 46$^a$ and collar 75 is the same as the corresponding parts shown in connection with the high pressure turbine 10. Lever 73 is connected to a valve member 76 which moves in a valve lining 77 in valve casing 78. In valve casing 78 are two annular chambers 79 and 80. Valve 76 has a passage 81 through its central portion which extends from its lower end to a point short of the upper end. Surrounding the central portion of valve 76 is a chamber 83 and in valve lining 77 are ports 84, 85 and 86. Pressure pipe 61 is connected to annular chamber 80 in valve casing 78. Connected with the bottom of valve chamber 78 is a discharge or waste pipe 87 and connected with annular chamber 79 is an inlet pressure pipe 88. The pressure pipe 88 may be connected to any suitable source of fluid pressure but it is preferably connected to the forced feed lubricating system for the turbines. As is well understood the pump for supplying lubricant to such a system is usually driven directly from the turbine shaft. At 82 is a groove surrounding the upper end of valve 76 and a small hole connects it to passage 81; this serves as a packing means for preventing leakage.

With the parts as shown in Fig. 3 of the drawing, pressure entering through pipe 88 passes from annular chamber 79 through ports 84 to chamber 83, thence through ports 85 to chamber 80 after which it passes through pressure pipe 61, to the underside of diaphragm 60. Ports 86 are covered by valve 76. As a result diaphragm 60 is subjected directly to the pressure from pressure pipe 88 which as already stated, connects with the lubricating system for the installation.

The operation is as follows:—

Assume that the turbines 10 and 13 are running and the valve 26 is open; also that there is a suitable supply of oil pressure to the bearings and that the speed is not excessive. Under these conditions, the various parts are in the positions shown in the drawing. Valve 26 is held open by catch 37 which is engaged under catch plate 31, and spring 34 is under tension. Plunger rod 41 is held up against the action of spring 45 by trip finger 44 and the end of lever 52 rests on catch 65 which is held up by the pressure under diaphragm 60. Spring 54 is under compression. In connection with the low pressure turbine, the trip finger 44$^a$ is under plunger rod 41$^a$ and holds the parts in the position shown in Fig. 3.

If now the speed of the high pressure turbine should become excessive, plunger 48 will move radially outward against the action of spring 49 striking trip finger 44 and knocking it from under the end of plunger rod 41. Spring 45 will then force plunger rod 41 downward thus turning shaft 36 against the action of spring 38 and move catch 37 from engagement with catch plate 31, whereupon spring 34 will immediately pull valve 26 shut. Since sleeve 50 is loose on shaft 36, it will be clear that shaft 36 can turn independently of lever 52 and that this lever and the parts associated therewith will not be affected although operating handle 57 and arm 58 will turn with the shaft.

To reset the device, lever arm 68 is moved upward to engage the bottom of frame 30 to move valve 26 to open position, after which handle 57 is utilized to turn shaft 36, thereby raising plunger rod 41 so that trip finger 44 may again drop under the bottom of it. At the same time this turning of shaft 36 brings catch 37 into engagement with catch plate 31.

In case the speed of the low pressure turbine should become excessive, plunger 48$^a$ will be thrown outward by centrifugal force against the action of spring 49$^a$ striking trip finger 44$^a$ and moving it from under plunger rod 41$^a$. Spring 45$^a$ will thereupon force plunger rod 41$^a$ downward causing lever 73 to turn on its pivot 74, thereby lifting valve 76. As a result of this, the valve uncovers ports 86 and covers ports 85. Pressure pipe 61 is thereupon connected directly through annular chamber 80 and ports 86 to waste pipe 87. This relieves the pressure under diaphragm 60, whereupon spring 66 will force the diaphragm downward thus pulling down on arm 63 of the bell crank lever and moving catch 65 from beneath lever arm 52. As soon as lever arm 52 is released spring 54 which is under compression turns sleeve 50 to bring lever 52 into engagement with arm 58 which will thereupon turn shaft 36 and trip the valve mechanism as above described. When this occurs, lever arm 40 moves independently of plunger rod 41, bolt 42 moving downward in slot 43. When the oil pressure under diaphragm 60 has been restored by the resetting of plunger rod 41$^a$ which may be accomplished by lifting up on the right hand end of lever 73, thereby lowering valve 76 and permitting trip finger 44$^a$ to again engage under plunger rod 41$^a$, the remainder of the mechanism is reset by first turning sleeve 50 by means of operating handle 51 to bring lever 52 back into engagement with catch 65 at the same time putting spring 54 under compression. The valve 26 is then reset in the manner already described.

In case the oil pressure which is supplied through pipe 88 from the lubricating system should fail, then the valve mechanism will be tripped in the manner just described as is obvious. If it is desired to trip the valve mechanism by hand it may be done by turning shaft 36 by means of handle 57 and this will not disturb the setting of either the speed controlled trips or the pressure controlled trip since bolt 42 can move downward in slot 43, and sleeve 50 is loose on shaft 36.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a prime mover installation, a plurality of prime movers receiving elastic fluid from a common source and driving a common load, valve means controlling the flow of elastic fluid to the prime movers, and means for automatically closing said valve means in case the speed of either prime mover becomes excessive.

2. In a prime mover installation comprising a high pressure prime mover and a low pressure prime mover connected in series, a conduit for supplying elastic fluid to the high pressure prime mover, an emergency valve therein, and means for effecting the closing of said valve in case the speed of either of said prime movers becomes excessive.

3. In a prime mover installation comprising a high pressure prime mover and a low pressure prime mover connected in series, a conduit for supplying elastic fluid to the high pressure prime mover, an emergency valve therein, and means for effecting the closing of said valve in case of the occurrence of an abnormal operating condition of either prime mover.

4. In a prime mover installation comprising a high pressure prime mover and a low pressure prime mover connected in series, a conduit for supplying elastic fluid to the high pressure prime mover, an emergency valve therein, a mechanically actuated means associated with one of said prime movers for effecting the closing of said valve, and a fluid pressure actuated means associated with the other of said prime movers for effecting the closing of said valve.

5. In a prime mover installation comprising a high pressure prime mover and a low pressure prime mover connected in series, a conduit for supplying elastic fluid to the high pressure prime mover, an emergency valve therein, a mechanically actuated means associated with one of said prime movers for effecting the closing of said valve, a fluid pressure actuated means associated with the other of said prime movers for effecting the closing of said valve, said fluid pressure being derived from the lubricating system for the prime mover.

6. In combination, a high pressure prime mover, a lower pressure prime mover, a conduit for supplying elastic fluid to the high pressure prime mover, a conduit connecting the exhaust end of the high pressure prime mover to the inlet of the low pressure prime mover, an emergency valve in the first named conduit, means for holding it open, and means responsive to an abnormal operating condition of either of said prime movers for releasing said holding means to permit the valve to close.

7. In combination, a high pressure prime mover, a lower pressure prime mover, a conduit for supplying elastic fluid to the high pressure prime mover, a conduit connecting the exhaust end of the high pressure prime mover to the inlet of the low pressure prime mover, an emergency valve in the first named conduit, means for holding it open, a mechanical means and a fluid actuated means for releasing said holding means, a speed responsive device on the high pressure prime mover for actuating said mechanical means, and a speed responsive device on the low pressure prime mover for actuating said fluid actuated means.

8. In combination, a prime mover, an emergency valve for shutting off the supply of elastic fluid thereto, a catch for holding said valve open, a fluid actuated abutment for releasing said catch, a valve controlling the supply of fluid to said abutment, and speed responsive means for actuating said last named valve.

9. In combination, a prime mover, an emergency valve for shutting off the supply of elastic fluid thereto, a catch for holding said valve open, a fluid actuated abutment for releasing said catch when the fluid pressure on the abutment is released, a pipe for supplying fluid pressure to said abutment, a valve in said pipe, which in one position connects said pipe to a fluid pressure supply and in another position connects it to a region of lower pressure, and speed responsive means for controlling said last named valve.

In witness whereof, I have hereunto set my hand this 19th day of March 1920.

EDGAR D. DICKINSON.